United States Patent [19]

Steinle

[11] Patent Number: 5,032,004

[45] Date of Patent: Jul. 16, 1991

[54] BEAM SPLITTER APPARATUS WITH ADJUSTABLE IMAGE FOCUS AND REGISTRATION

[75] Inventor: Michael J. Steinle, Fort Collins, Colo.

[73] Assignee: Hewlett-Packard Company, Palo Alto, Calif.

[21] Appl. No.: 526,348

[22] Filed: May 21, 1990

Related U.S. Application Data

[63] Continuation-in-part of Ser. No. 498,865, Mar. 23, 1990.

[51] Int. Cl.[5] .................. G02B 27/14; G02B 5/28; G01J 3/50
[52] U.S. Cl. .................................. 350/171; 350/173; 350/166; 250/226
[58] Field of Search ............... 350/171, 173, 174, 166; 250/226

[56] References Cited

U.S. PATENT DOCUMENTS

| | | | |
|---|---|---|---|
| 4,164,752 | 8/1979 | Doi et al. | 350/173 |
| 4,709,144 | 11/1987 | Vincent | 250/226 |
| 4,870,268 | 9/1989 | Vincent et al. | |

Primary Examiner—Jon W. Henry

[57] ABSTRACT

An optical device for splitting an imaging light beam into at least three spacially and spectrally separated component beams which includes a plurality of surface pairs. Each of the surface pairs includes a first surface and a second surface. The first surface of each of the surface pairs is adapted to reflect a different one of the component beams. The second surface of each said surface pairs is adapted to reflect all of the component beams except for the component beam reflected by the associated first surface. A method for optimizing the performance of such an optical device is also disclosed.

19 Claims, 7 Drawing Sheets

BEAM SPLITTER APPARATUS WITH ADJUSTABLE IMAGE FOCUS AND REGISTRATION

This application is a continuation-in-part of U.S. patent application Ser. No. 498,865 filed Mar. 23, 1990, for BEAM SPLITTER/COMBINER WITH PATH LENGTH COMPENSATOR; and Ser. No. 519,069 filed May 3, 1990, for BEAM SPLITTER/COMBINER APPARATUS, both of Michael John Steinle which are hereby specifically incorporated by reference for all that is disclosed therein.

BACKGROUND OF THE INVENTION

The present invention relates generally to color imaging assemblies which employ multiple, spectrally selective, reflective layers for generating spacially separated, color component images of an object on an image plane, and more particularly to arrangements of the spaced-apart reflective layers which optimizes component beam imaging and registration with sensor arrays positioned on the image plane.

The phrase "beam of light" is sometimes narrowly defined to mean a bundle of parallel light rays such as those generated by a collimated light source. The phrase "beam of light" may also be more broadly defined to mean any narrow shaft of light having light rays traveling in the same general direction. Used in this broader sense, the light which emanates from an object and passes through the aperture of an imaging lens as well as the converging cone of light which emerges from the lens and which is focused on an image plane may be collectively referred to as a "beam of light." When the phrase "beam of light" is used herein, it is to be understood that this broader meaning is intended.

Vincent al., U.S. Pat. No. 4,709,144 Vincent et at., U.S. Pat. No. 4,870,268, which are hereby specifically incorporated by reference for all that is disclosed therein, describe a number of different dichroic composites which are used in beam splitter assemblies and beam combiner assemblies. An optical scanner which employs a beam splitter is described in commonly assigned U.S. patent application Ser. No. 383,463 filed July 20, 1989, for OPTICAL SCANNER of David Wayne Boyd which is hereby specifically incorporated by reference for all that it discloses. A component beam path length compensator is described in commonly assigned U.S. patent application Ser. No. 498,865 filed Mar. 23, 1990, for BEAM SPLITTER/COMBINER WITH PATH LENGTH COMPENSATOR of Michael John Steinle, which is hereby specifically incorporated by reference for all that it discloses.

Certain prior art beam splitter assemblies which are disclosed in U.S. Pat. Nos. 4,709,144 and 4,870,268 will now be briefly described with reference to FIGS. 1–4.

FIG. 1 is a schematic side elevation view of a line-focus-type color imaging assembly comprising a line object 1 which originates a polychromatic light beam 4 which passes through an imaging lens 6 which is adapted to focus a line image of the line object on an image plane II located at a fixed optical path length distance from the imaging lens 6. The light beam 4 impinges upon a dichroic beam splitter 56 which splits the polychromatic light beam 4 into spectrally and spacially separated color component beams 8, 9, 10 which provide focused color component images of the line object on a monolithic photosensor unit 11, FIGS. 1 and 2, positioned at the image plane II.

FIG. 1 illustrates the manner in which two optically flat transparent optical support media 60 and 62 can be attached to provide three substantially equally spaced dichroic coatings to produce three substantilly parallel optical component beams 8, 9, 10 that are both spacially and spectrally separated. The optical separator 56 consists of precisely ground and polished glass plates 60 and 62 coated on one or both faces with dichroic coatings 50, 52 and 54. At each dichroic coating 50, 52 and 54, incident light is either reflected or transmitted according to wavelength with negligible absorption loss. The composition of the dichroic coatings 50, 52 and 54 can be designed for accurate bandpass filtration.

The plate 60, shown in FIG. 1, is designed such that incident light striking dichroic coating 50 at 45° reflects blue light (approximately 400–500 nm) while transmitting red light and green light.

Plate 62, shown in FIG. 1, is coated on both faces with dichroic coatings 52 and 54 such that an incident polychromatic light beam 4 striking a first dichroic coating 52 at nominally 45° reflects the red spectral band (e.g., 600–700 nm) while transmitting the green band. The green light striking a second dichroic coating 54 and having an optical axis oriented nominally 45° from the dichroic coating is reflected. The reflected green light is caused to pass back through the glass plate 62 and through the other dichroic coatings 52 and 50 at a 45° angle. As shown in FIG. 1, each of the color components 8, 9 and 10 of the incident light are reflected at 90° to incoming beam 4. The reflected red and green components 9 and 8 are parallel and separated from each other by a distance determined by the glass plate 62 and dichroic coating thickness 52, the index of refraction of plate 62, and the angle of incidence. Similarly, the blue and red components 10 and 9 are separated by a distance determined by the thickness of the glass plate 60, dichroic coating 50, the index of refraction of the plate 60 and the angle of incidence.

A mirror coating could be substituted for the third dichroic coating 54, since only the third remaining color component reaches that coating interface.

A suitable photosensor unit 11 for use with optical separator 56 is shown in FIG. 2. Photosensor 11 may be a single chip, single package solid state device having three linear photosensor arrays, 12, 13 and 14, precisely aligned and spaced to coincide with the focused line images formed by beams 8, 9 and 10, respectively, shown in FIG. 1.

As illustrated in FIG. 1, light in each of the color component beams 8, 9, 10 travels a different optical path length through the beam splitter 56. As a result in the differences in component beam light path length through beam splitter 56, photosensor unit 11 is skewed at an angle theta relative to a component beam normal plane such that the total optical path lengths of each of the different color components, as measured from lens 6 to the photosensor unit 11, are equal. Angle theta and the distance "D" between linear photosensor arrays 13, 14 are functions of glass plate and dichroic layer thickness X and index of refraction.

FIG. 3 shows a beam splitter/photosensor arrangement which enables photosensor 11 to be positioned perpendicular to the optical axes of the color-separated beams. In this arrangement, the path-lengths-through-glass of the color-separated beams are made equal by the reciprocal arrangement of trichromatic beam splitters 56 and 58.

As shown in FIG. 3, the incident light beam 4 is aligned to impinge the hypotenuse face 32 of right angle prism 51 at a normal angle and transmit therein to a first base side 30 of the prism 51 which the light beam impinges at 45°. The composite beam splitter 56 of FIG. 1 is attached thereto. A trichromatic separation of the red, green and blue spectral components of the incident light beam occurs as previously described. The three reflected component beams re-enter the prism 51 and are directed toward the second base side 34 of prism 51, each separated beam impinging the second base side 34 at 45° incidence. A second composite beam splitter 58 is attached to the second base side 34 of prism 51. The plates 60 and 62 and the dichroic coatings 50, 52 and 54 in beam splitters 56 and 58 are identical. However, the orientation of the composite beam splitters 56 and 58, and the multilayer dielectric coatings 50, 52 and 54 on each base side 30 and 34 of the prism 51 are reversed so that the path lengths of each component color beam entering and exiting the trichromatic prism beam splitter 59 are identical. That is, a component color beam, such as blue, reflects off the dichroic coating 50 on plate 60 located on base side 30. Next, the blue component reflects off the dichroic coating 50 on plate 60 located adjacent to base side 34. In a like manner, a red component color beam goes from middle filter 52 on base side 30 to middle filter 52 on base side 34, and the green component reflects off a backside filter 54 to a front side filter 54. Reflected beams from the trichromatic beam splitter 58 adjacent to base side 34 are directed out of prism 51. The beams are perpendicular to the hypotenuse side 32 and parallel to the incident light beam. The thickness of the beam splitter glass plates, 60 and 62, and the dichroic coatings, 50, 52 and 54, determine the separation of the reflected beams. Thus, the dual trichromatic beam splitter 59 provides an equal path length through the glass for all color components. Also, the light enters and leaves the prism at a normal angle of incidence.

Referring to FIG. 4, a fluorescent light source 22 illuminates the surface of an original document 21. A beam of imaging light from the original document is projected onto a beam splitter assembly, consisting of dichroic beam splitters 16 and 17, by lens 6. Beam splitters 16 and 17 are flat glass plates coated on one side with dichroic coatings 50 and 52, respectively. Beam splitter 16 is designed to reflect blue light while transmitting red and green spectral bands. The blue light is reflected to a first CCD linear-array photosensor 18, with beam splitter 16 tilted at 45° to the incident light beam 4. Beam splitter 17 reflects red light to a second CCD photodiode array sensor 20. The green line image passing through both beam splitter plates is captured by the third CCD photodiode array sensor 19. Beam splitter plate 17 is also aligned at 45° to the incident light beam 4, as shown. In this arrangement in which each linear photosensor array 18, 19, 20 is provided on a separate photosensor unit differences in optical path lengths of the color component beams through beam splitters 16, 17 are compensated by individually adjusting the positions of the different photosensor units.

U.S. Pat. No. 4,870,268 also discloses a dichroic layer device which comprises a transparent plate having two parallel planar surfaces which is mounted with one of the parallel surfaces positioned in parallel, adjacent relationship with the planar surface of an optical support medium by means of spacers which provide an air gap between the planar surface of the optical support medium and the adjacent planar surface of the plate. The two planar surfaces of the plate and the planar surface of the support medium are each coated with a different dichroic material adapted to reflect different spectral ranges of light. Such a spaced layer arrangement may thus be used to eliminate the need for one of the plates 60, 62 in each of the beam splitter components 56, 58 in a compound beam splitter assembly such as illustrated in FIG. 3.

In the construction of parallel reflective layer-type beam splitters such as illustrated in FIGS. 1 and 3, it is generally desirable, in order to maintain high optical quality in the separated component beams and also to provide a compact beam splitter assembly, to have a relatively small separation between the parallel dichroic layers in each dichroic composite. When a beam splitter is used in a color optical imaging device, it is necessary to provide at least three separate component beams, usually red, green and blue, for proper color imaging. Thus, in prior art beam splitters of the type adapted to produce parallel component light beams, e.g. FIGS. 1 and 3, at least three, parallel, spaced-apart, dichroic layers have been provided. In a compound beam splitter such as illustrated in FIG. 3, each of the component parallel layer beam splitter arrays comprises three spaced-apart dichroic layers. In such arrangements, even if one of the plates in each parallel layer array is replaced by an air gap, it is necessary to employ at least one relatively thin transparent plate for providing mounting surfaces for the different dichroic layers.

However, the use of such thin transparent plates has proved to be problematic. Due to the flexibility of such thin plates, it is difficult to maintain flatness of each surface and parallelism between the three reflective surfaces in a beam splitter composite. When a thin plate is adhered to another surface, discontinuities in the adhesion material tend to produce warping in the attached thin plate. When a thin plate is supported on spacers to provide an air gap between dichroic layers, the lack of rigidity of the plate and the fact that all points on the plate are not supported by the spacers tend to cause warping of the thin plate.

The optical imaging device illustrated in FIG. 3 is adapted to provide focused component images on a plane positioned perpendicular to the component light beams. Such an imaging device requires a total of six separate reflective layers, thus compounding the problems of keeping each of the light reflective layers flat and in proper relationship with the other layers.

Another problem in the construction of composite type beam splitter results from the fact that different spectral ranges of light usually have different indexes of refraction in any given optical medium. As a result, component beams focused by an imaging lens will generally have slightly different focal lengths. Although such chromatic aberration may be corrected through use of a compound lens assembly constructed from a plurality of different materials which are selected to mutually cancel out their individual chromatic aberrations, such lens assemblies are considerably more difficult and more expensive to produce than single medium lens assemblies.

As a result of difficulties experienced in maintaining surface flatness and parallelism in light reflective surfaces and as a result of chromatic aberration produced by ordinary imaging lens assemblies, significant problems are encountered in the construction and assembly of optical imaging devices which employ composite layer type beam splitters and a unitary photosensor unit with coplanar, evenly spaced, linear photosensor arrays. One problem is achieving registration between component beams and corresponding linear photosensor arrays. Another problem is producing a properly focused component image on each linear photosensor array.

SUMMARY OF THE INVENTION

The present invention may comprise an optical imaging apparatus which includes an imaging lens for imaging a line object and a beam splitter for splitting a polychromatic imaging light beam emanating from the line object and focused by the imaging lens into first, second and third, spacially and spectrally separated, component beams of first, second and third spectral ranges. First, second and third linear photosensor arrays positioned in parallel, spaced apart relationship on a unitary image plane are adapted to be impinged by the first, second and third component beams, respectively, and generate data signals representative of color component images which are focused thereon. The beam splitter includes a first planar surface which transmits light in the first spectral range and which reflects light in the second and third spectral ranges.

A second planar surface is positioned adjacent to the first planar surface in generally parallel relationship therewith and reflects light in the first spectral range. A third planar surface is oriented obliquely of the first and second surfaces and transmits light in the second spectral range and reflects light in the first and third spectral ranges. A fourth planar surface is positioned adjacent to the third planar surface in generally parallel relationship thereto for reflecting light in the second spectral range. The second and fourth planar surfaces are spaced from the first and third surfaces at distances which provide a focused component image on each of the first and second linear photosensor arrays.

The invention may also comprise an optical device for splitting an imaging light beam into at least three spacially and spectrally separated component beams which includes a plurality of surface pairs. Each of the surface pairs includes a first surface and a second surface. The first surface of each of the surface pairs is adapted to reflect a different one of the component beams. The second surface of each said surface pairs is adapted to reflect all of the component beams except for the component beam reflected by the associated first surface. The invention may also comprise a method for optimizing the performance of such an optical device.

The method may comprise the step of adjusting the focus of one of the component beams on an associated photosensor array by adjusting the spacing between the first surface and the second surface of one of the surface pairs. The invention may comprise the further or alternative step of adjusting the registration between one of the component beams and an associated photosensor array by adjusting the angle of inclination between the first surface and the second surface of one of the surface pairs.

BRIEF DESCRIPTION OF THE DRAWINGS

An illustrative and presently preferred embodiment of the invention is shown in the accompanying drawings in which.

DETAILED DESCRIPTION OF THE INVENTION

Figure 1:
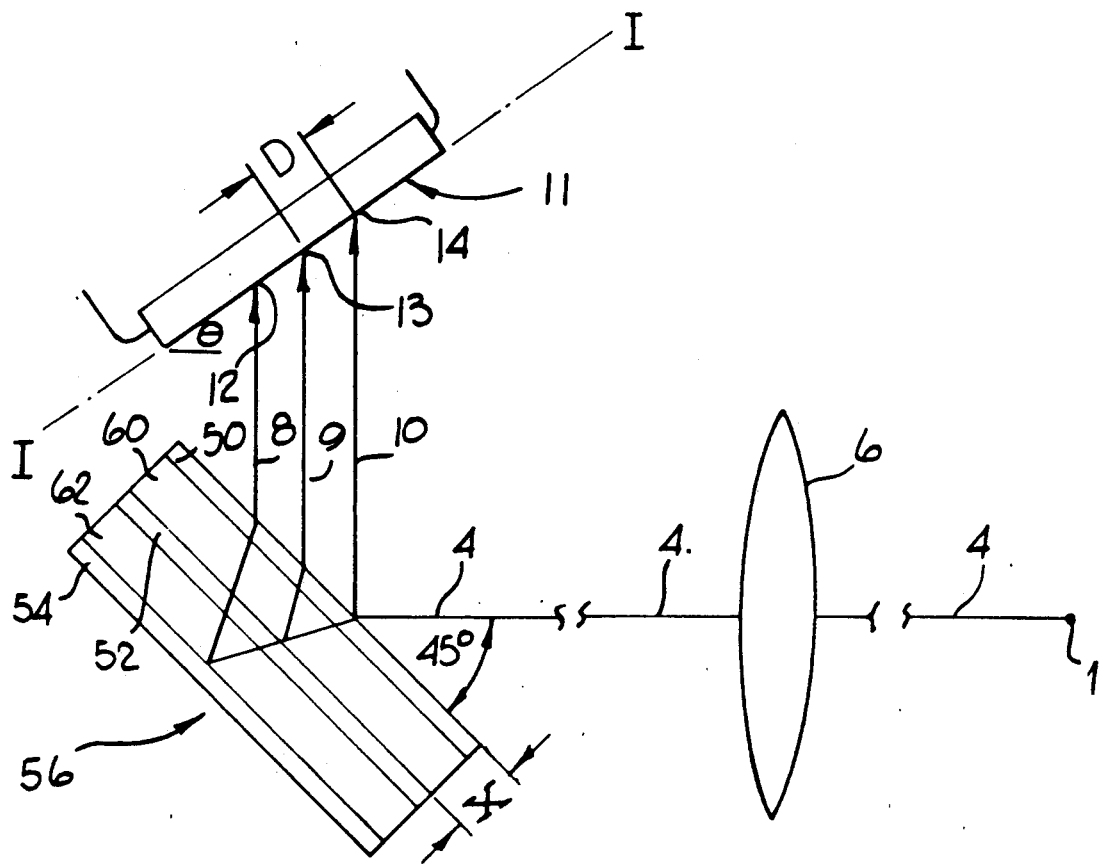
FIG. 1 is a side elevation view of a prior art color imaging assembly.
Figure 2:
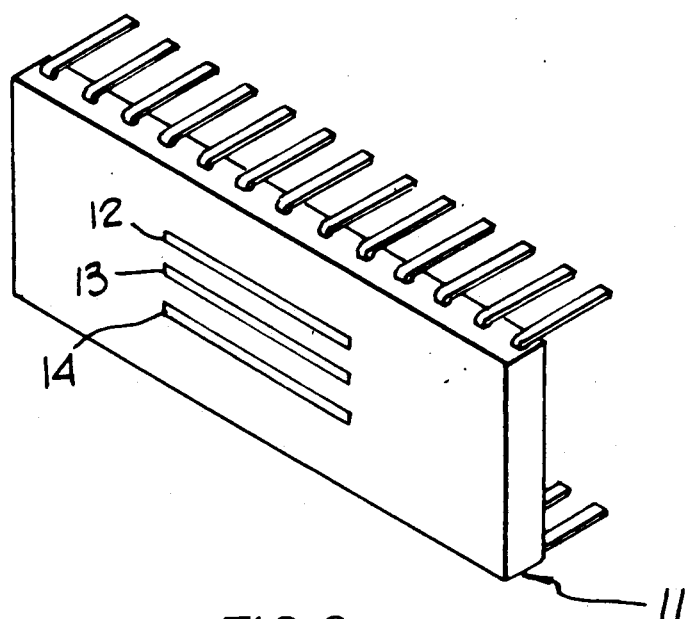
FIG. 2 is a perspective view of a prior art photosensor assembly.
Figure 3:
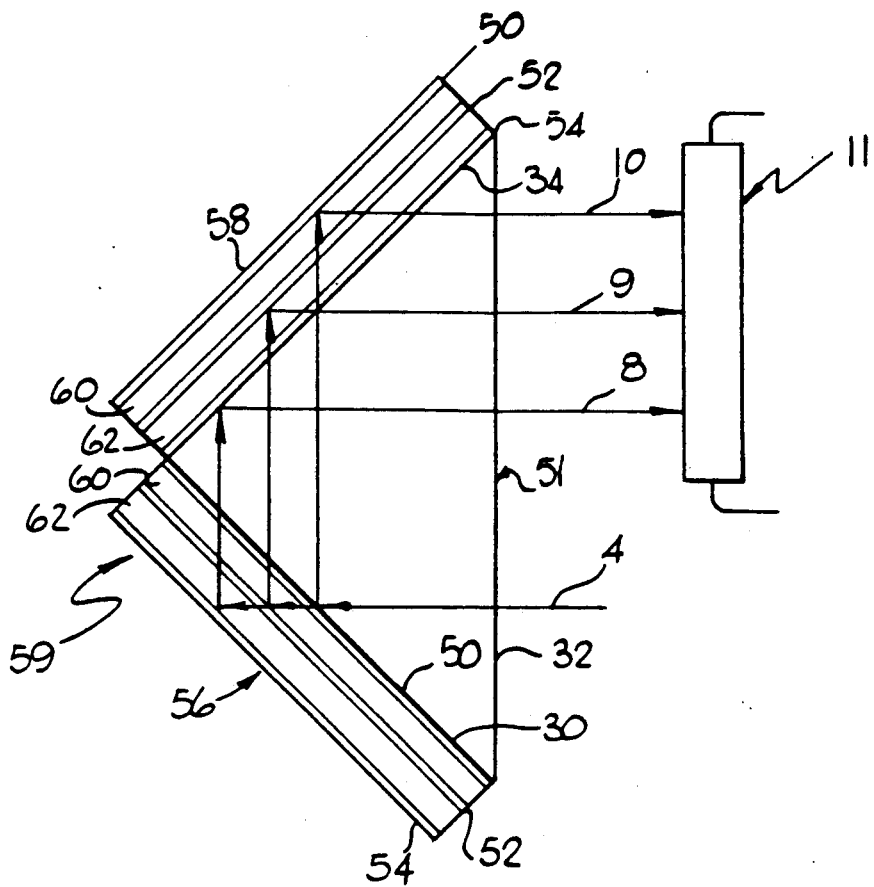
FIG. 3 is a side elevation view of a prior art dual trichromatic beam splitter assembly mounted on a prism.
Figure 4:
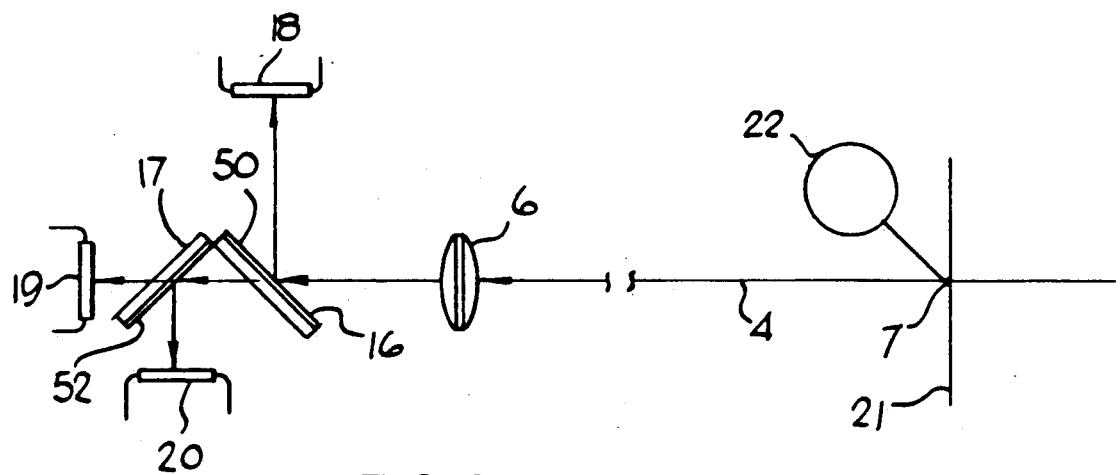
FIG. 4 is a side elevation view of a prior art color imaging assembly employing two beam splitter units and three separate photosensor units.
Figure 5:
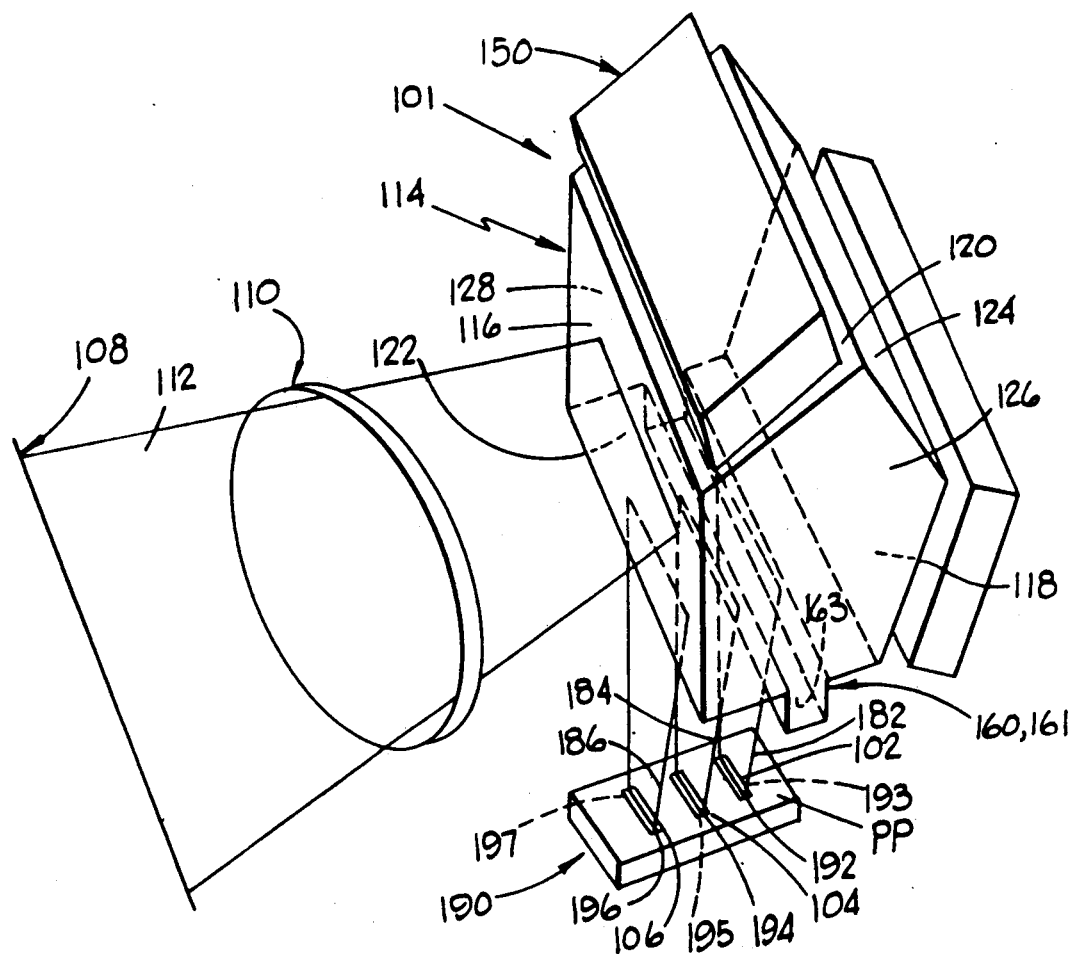
FIG. 5 is a perspective view of an optical imaging apparatus employing a multilayered beam splitter.
Figure 6:
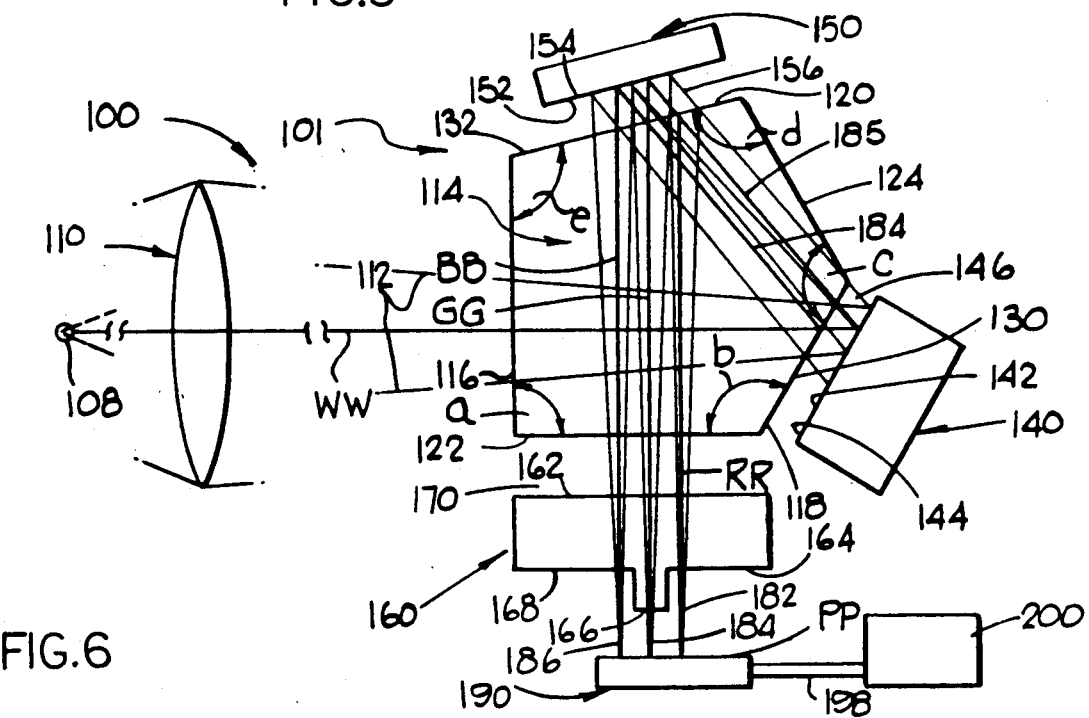
FIG. 6 is a side elevation view of the optical imaging apparatus of FIG. 5 provided with an alternative path length compensator configuration.

FIGS. 5 and 6 illustrate a color imaging assembly 100 which is adapted for providing spacially separated color component images 102, 104, 106 of an object 108, which may be the scan line of an optical scanner, on a unitary image plane PP.

An imaging lens assembly 110 convergingly transmits a polychromatic imaging light beam 112 (having an optical axis WW) from the object 108 to an optical separator device 101. In the preferred embodiment of the invention illustrated in FIGS. 5 and 6, the optical separator device comprises a prism 114, a first rigid plate 140, and a second rigid plate 150 having predetermined surface portions thereof coated with predetermined, spectrally selective, reflective material. The optical separator device 101 separates the polychromatic imaging light beam 112 into component beams 182, 184, 186 which in one preferred embodiment comprise red, green and blue component beams having parallel, spaced-apart optical axes RR, BB, GG. A path length compensator 160 is provided for compensating for differences in the optical path length of the component beams. For purposes of clarity, in all drawing figures other than FIG. 6, only the central planes of the imaging light beam 112 and the component beams 182, 184, 186 are shown. However, it is to be understood that in each of the figures the beams are converging beams such as illustrated in FIG. 6.

In an embodiment of the invention, e.g. FIGS. 5 and 6, in which the color imaging assembly 100 is an optical scanner, the spacially separated color component images 102, 104, 106 are each projected onto a separate linear photosensor array 192, 194, 196 provided in coplanar relationship in a unitary photosensor assembly 190. The photosensor assembly 190 transmits data signals corresponding to the color component images as by data transmission cable 198 to a data processing and/or storage apparatus 200. An optical scanner structure of the type into which the color imaging assembly 100 may be incorporated is described in U.S. patent application Ser. No. 383,463 incorporated by reference above.

Prism 114 comprises a first, second, third, fourth, and fifth side faces 116, 118, 120, 122, 124 Which extend at right angles between opposite, identically-shaped, irregular-pentagon-shaped end faces 126, 128. In one preferred embodiment of the invention which is adapted for imaging a scan line 108 having a length of 216 mm and in which the imaging lens assembly 110 comprises a double Gauss lens having the following parameters: object distance, 357.1 mm; focal length; 42.57 mm; aperture f/number, 5.3; transverse magnification, −0.126091; entrance pupil radius, 4.000 mm; and in which the first face 116 of the prism 114 is positioned normal to the optical path of the imaging light beam 112 and is located at a distance of 391 mm from object 108 as measured along light path 112. The length of each side face, as measured between the end faces, may be 27.2 mm; the height of the first face 116 may be 2.5 mm; the height of the second face 118 may be 2.5 mm; the height of the third face 120 may be 2.0 mm; the height of the fourth face 122 may be 1.8 mm; and the height of the fifth face 124 may be 0.7 mm. Angles a, b, c, d, and e may be 90°, 112.5°, 112.5°, 112.5°, and 112.5°, respectively. As used herein, the height of each face refers to the dimension of the face measured perpendicular to its length.

A surface coating 130 which is adapted to reflect blue light and transmit other spectral ranges of light is applied to the second side face 118 of the prism. Coating 130 may comprise a blue light reflecting dichroic coating having a thickness of approximately 0.002 mm. The surface of the third side face 120 of the prism is provided with a surface coating 132 which is adapted to reflect red light and to transmit other spectral ranges of light. Surface coating 132 may comprise a dichroic coating having a thickness of 0.002 mm.

A first rigid plate 140 which may have a thickness of, e.g., 2.1 mm, a length of, e.g., 25 mm, and a width of, e.g., 2.5 mm is mounted in fixed relationship with prism 114 opposite second side face 118. The first rigid plate 140 comprises a planar surface 142 which is positioned adjacent and parallel to prism face 118. Planar surface 142 has a surface coating 144 applied thereto which is adapted to reflect red light and green light and which is adapted to transmit other spectral ranges of light. Coating 144 may be a dichroic coating having a thickness of, e.g. 0.002 mm. Planar surface 142 is separated from prism face 118 by an air gap 146 having a dimension measured perpendicular to the two planar surfaces of, e.g., 0.15 mm.

A second rigid plate 150 which may be identical in construction to plate 140 is positioned in fixed relationship with prism 114 opposite third prism side face 120. Rigid plate 150 has a planar surface 152 positioned parallel and adjacent to prism side face 120. Surface 152 has a surface coating 154 applied thereto which is adapted to reflect blue and green light and which is adapted to transmit other spectral ranges of light, i.e. red light. Planar surface 152 is separated from third prism face 120 by an air gap 156 having a gap distance which may be selected to provide equal spacing between component beams, e.g. 0.15 mm.

A compensator 160, which in the illustration in FIG. 6 comprises a block separated from the prism 114 by an air gap 170, comprises a top surface 162 positioned perpendicular to prism face 122 and comprises first, second and third planar lower surface portions 164, 166, 168 which are also positioned perpendicular to prism face 122. Second surface 166 is positioned lower than first and third lower surface portions 164, 168. First surface portion 164 is adapted to intersect the red component light beam 182, second lower surface portion 166 is adapted to intersect the green component light beam 184, and third lower surface portion 168 is adapted to intersect the blue component light beam 186. The different relative elevation of surface 166 from that of surfaces 164 and 168 is adapted to compensate for the relatively longer light path of the green component beam 184 through the prism 114 as opposed to the relatively shorter path lengths of the red component beam 182 and the blue component beam 186, which are identical in path length.

Alternately, as illustrated in FIG. 5, path length compensator 160 may comprise a parallelepiped-shaped block 161 which may be integrally formed with or separately formed and attached to the prism 114 and which has a lower surface 162 which is adapted to intersect only the green component beam 184, the red and blue component beams each exiting the prism through fourth prism face 122. The use and construction of step-type compensators such as compensator 160 are described in U.S. patent application Ser. No. 498,865 filed Mar. 23, 1990, of Michael John Steinle for BEAM SPLITTER/COMBINER WITH PATH LENGTH COMPENSATOR, which is hereby specifically incorporated by reference for all that it discloses. In one preferred embodiment of the invention in which the prism and compensator 160 each have an index of refraction of 1.519; and in which the spacing between linear photosensor arrays 192 and 194 and between arrays 194 and 196 are each 200 microns; and in which air gaps 146, 156 are each 152 microns, the step thickness of compensator 160 is approximately 1,090 microns, i.e. the distance between surfaces 164 and 166 and between surfaces 168 and 166 in the embodiment of FIG. 6, or alternatively the distance of surface 163 from prism face 122 in the embodiment of FIG. 5, is approximately 1,090 microns.

As previously mentioned, the optical separator device 101 is adapted to separate an incident beam 112 of polychromatic imaging light into parallel, spacially separated, component beams 182, 184, 186. The incident beam 112 initially impinges upon normal, uncoated or antireflective-coated prism face 116, passing therethrough without significant reflection of any spectral band. The imaging beam 112 next impinges upon coated surface 118 which reflects blue light to provide a first separated blue component beam 184. The remaining spectral components in light beam 112 next impinge upon surface coating 144 which reflects the remaining red and green spectral bands in a compound component beam 185. In a preferred embodiment of the invention, layer 142 comprises a mirror surface which may reflect all wavelengths of light but which only reflects red and green light of the impinging light beam due to the fact that the blue component beam has already been removed from the impinging light beam.

The blue component beam 184 reflected at surface 118 next passes through red reflective coating 132 on third prism side face 120, reflects from blue and green reflective layer 152 on plate surface 154, and thereafter is transmitted back through prism face 120, prism face 122, and compensator surfaces 162 and 168 prior to impinging upon linear photosensor array 196 on image plane PP.

The compound component beam 185 reflected from surface 144 passes back through prism face 118 and next impinges upon prism face 120 where a red component beam 182 is reflected by surface coating 132. The red component beam 182 thereafter passes through prism face 122, the upper surface 162 of compensator 160, and a lower surface portion 164 of compensator 160 before impinging upon associated linear photosensor array 192 on image plane PP. The green component 184 of compound component beam 185 passes through prism face 120 and is reflected by plate surface 154 which, in a preferred embodiment of the invention, is a mirror surface which reflects only blue and green light since all red light in the imaging beam has been previously reflected by red light reflective coating 132. The green component beam 184, subsequent to reflection at surface 152, is transmitted through surface 120 and surface coating 156, through surface 122, through path length compensator upper surface 162 and lower middle surface 166 and finally impinges upon liner photosensor array 194 located at image plane PP.

As previously mentioned, the component images 102, 104, 106 of the object 108 which are provided on the spaced-apart linear photosensor arrays 192, 194, 196 are converted by the photosensor arrays into electronic data by the photosensor assembly 190 and this data is transmitted by appropriate transmission devices such as data cable 198 to a data processing apparatus or storage apparatus 200 such as a microprocessor or the like. Conversion of an image of an object to electronic data by a photosensor array for storage or data processing purposes is well-known in the art.

As disclosed by Vincent, U.S. Pat. No. 4,870,268 and Steinle, U.S. patent application Ser. No. 498,865 incorporated by reference above, the various operating components of an optical imaging device may also be used in an inverse manner to provide a beam combiner assembly in which component beams of light are combined into a single beam of polychromatic light in which each of the combined component beams have coaxial axes. Such a beam combiner may be provided by the assembly of FIG. 6 by replacing the linear photosensor arrays 192, 194, 196 with linear light source arrays 193, 195, 197 as indicated with phantom lead lines in FIG. 5. In such a system, individual component beams 182, 184, 186 are combined by assembly 101 into a unitary polychromatic light beam 112 having a focus at 108. Beams 182 and 184 are combined by reflections at surfaces 120, 152, respectively, into a compound beam 185. Beam 186 which is reflected at surfaces 152 and 118, respectively, is combined with compound beam 185 which is reflected from surface 142 and combined with beam 186 at its point of reflection on surface 118. The difference in path length of component beam 184 from component beams 182 and 186 within assembly 101 are compensated for by compensator 160 such that all of the component beam portions of combined beam 112 have not only coaxial optical axes but also the same focus.

Each of the other beam separators described herein may also be used as beam combiners by replacing the respective photosensor arrays associated with each component beam of the beam splitter by a corresponding component beam light source. Each embodiment of the invention described herein is thus to be understood in the alternative, as constituting a beam combiner, even though separate reference numerals for each of the component beam light sources are not provided in the Figures other than FIG. 5.

Figure 7:
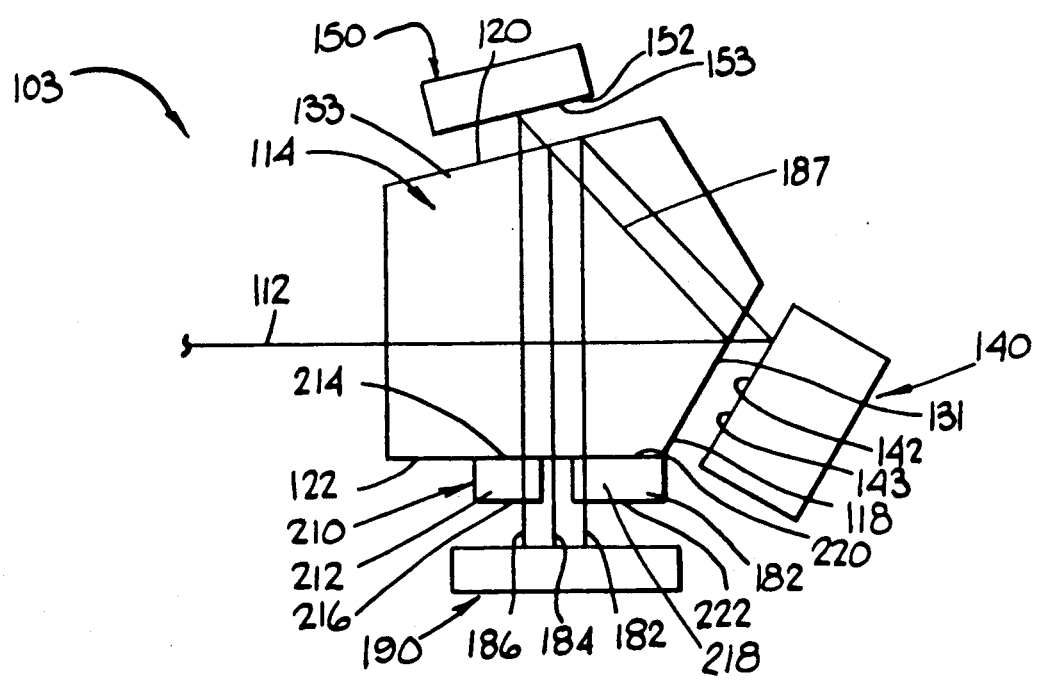
FIG. 7 is a side elevation view of another embodiment of an optical imaging apparatus.

FIG. 7 illustrates a variation 103 of optical separator device 101 comprising a prism 114, a first rigid plate 140, and a second rigid plate 150 which may be identical in construction to those illustrated in FIG. 6. However, in optical separator device 103, prism surface 118 is coated with a blue and green reflective surface coating 131; surface 142 is coated with a red reflective surface coating 143; surface 120 is coated with a green and red reflective surface coating 133, and surface 152 is coated with a blue reflective surface coating 153. Alternatively, surface coatings 143 and 153 may be mirror coatings. In such an arrangement, a blue and green compound beam 187 is reflected at surface 118; a green component beam is reflected at surface 120; a blue component beam is reflected at surface 152; and a red component beam is reflected at surfaces 142 and 120.

A path length compensator 210 for correcting the difference in path length of the green component beam 184 may be provided by a first transparent plate 212 having a planar upper surface 214 attached to surface 122 and a planar lower surface 216 which intersects component beam 186, and further by a second transparent plate 218 having a planar upper surface 220 attached to surface 122 and a planar lower surface 222 positioned at the same elevation as surface 216.

Figure 8:
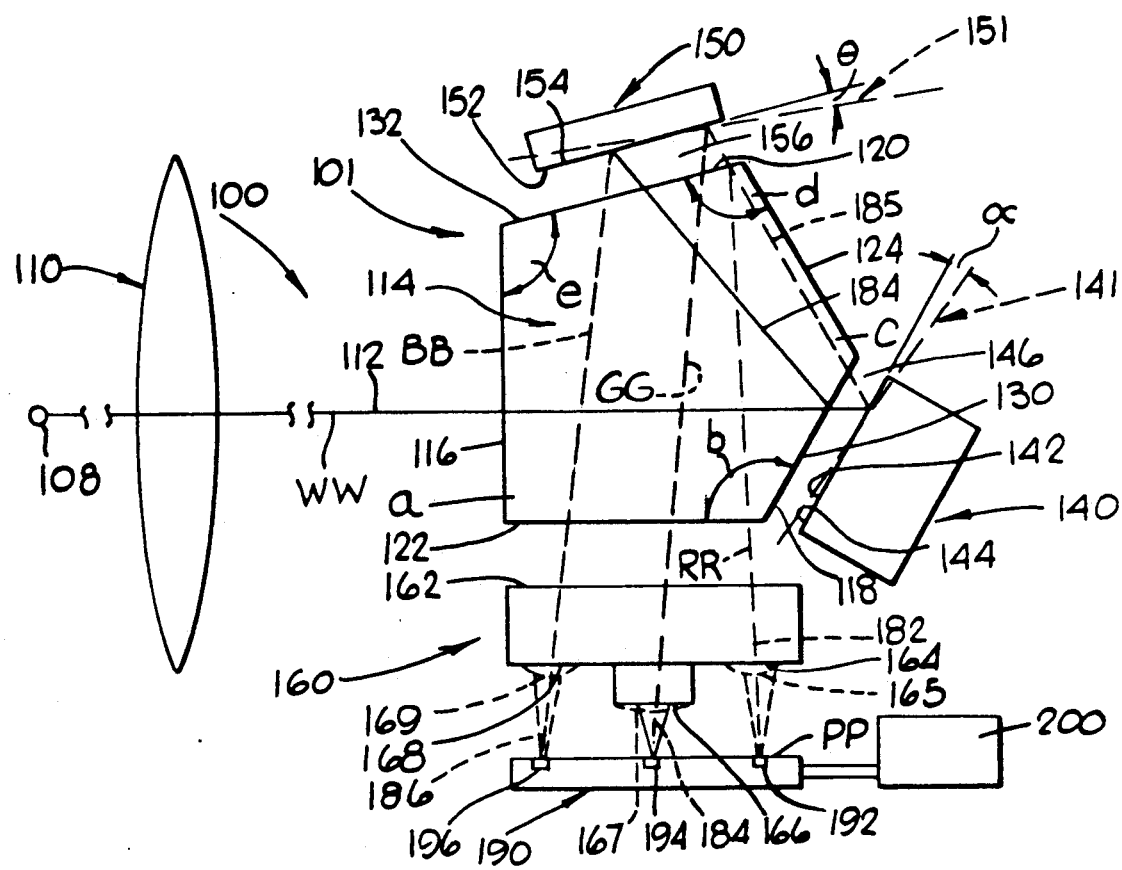
FIG. 8 is a side elevation view of the optical imaging apparatus of FIG. 6 used in association with a larger aperture lens and a wider photosensor array spacing.

FIG. 8 illustrates an optical separator device 101 identical to that shown in FIGS. 5 and 6 except that, as shown in dashed lines at 141, plate 140 has been inclined at a small acute angle "alpha" with respect to its original position in parallel relationship with prism face 18; and, as shown in dashed lines at 151 plate 150 has been inclined at a small acute angle "theta" with respect to its original position in parallel relationship with prism face 120. This angular variation in the position of each plate 140, 150 results in the component beams being positioned in non-parallel relationship and also results in a wider spacing of the component beams 182, 184, 186 at image plane PP so as to place component beams 182, 184, 186 in registration with associated linear photosensor arrays 192, 194, 196 which are spaced farther apart than in the arrangement shown in FIG. 6. As illustrated at 165 and 169 the lower surface of compensator 160, at the portion thereof which intersects beams 182 and 186, respectively, may be provided with a barrel shaped surface configuration to correct for minor astigmatism which may be produced in the component beams as a result of their passage through nonperpendicular air-/glass interfaces.

Figure 9:
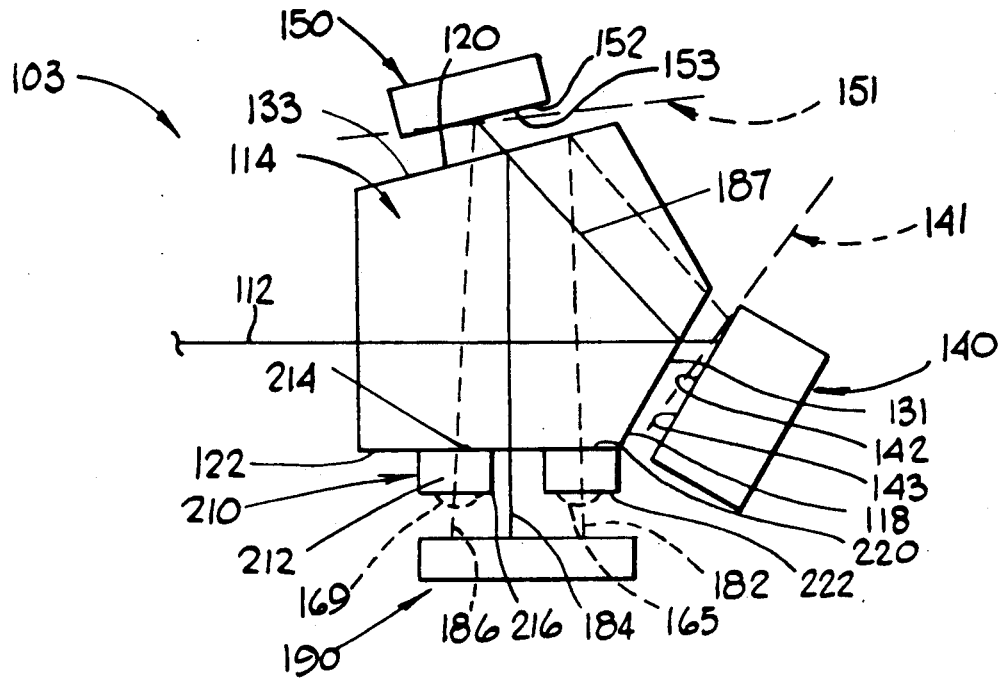
FIG. 9 is a side elevation view of the optical imaging apparatus of FIG. 7 used in association with a larger aperture lens and a wider photosensor array spacing.

The embodiment of the optical separator 101 shown in FIG.9 is able to accommodate a lens 110 having a larger aperture (a smaller f/number) than the lens 110 of the embodiment of FIG. 6. In the embodiment of FIG. 6, a relatively small aperture lens which produces focused beams having a relatively small angle of convergence must be used to avoid having any of the individual converging component beams 182, 184, 186 impinge upon more than one of the lower surfaces of the compensator 160. In the embodiment of FIG. 8 the wider spacing between component beams at the points where the beams intersect the lower surface of compensator 160 helps overcome this problem. Thus, in the embodiment of FIG. 8, component beams having a relatively larger angle of convergence, i.e. beams having a smaller f/number, may be used. (In FIG. 8 the convergence of the component beams 182, 184, 186 is shown only at the positions where each beam emerges from compensator 160 in order to simplify the drawing.) One beneficial result of using a lens with a smaller f/number is that component images with relatively greater light intensity may be provided at plane PP without increasing the light intensity of the associated imaging device light source, or alternatively an image with the same intensity as provided with the larger f/number may be provided using a lower intensity light source.

As in the embodiment of FIG. 6, in the embodiment of FIG. 8 the focus of the component images produced by beams 182 and 186 may be adjusted by changing the distance between plates 140 and 150 from the associated prism faces 118 and 120.

The optical separator 103 of FIG. 9 corresponds to the separator of FIG. 7 except that plates 140 and 150 have been inclined to the positions indicated at 141 and 151, with respect to associated prism faces 118 and 120, respectively. As a result, the component beams are separated more widely at image plane PP than in the embodiment of FIG. 7. Barrel lens devices 165, 169 may be provided, if necessary, for correcting astigmatism in the images formed by beams 184, 186. Alternatively astigmatism may be corrected by providing a corrective curvature in surfaces 142 and 152 of plates 140 and 150. Again, the focus of component beams 184, 186 on image plane PP may be adjusted by changing the distance between plates 140 and 150 and associated prism faces 118, 120, thus enabling correction for any focus change induced by the angular displacement of plates 140 and 150 and also enabling correction of chromatic aberration in the associated imaging lens. The embodiment of FIG. 9 is presently the best mode contemplated for practicing the invention.

Figure 10:
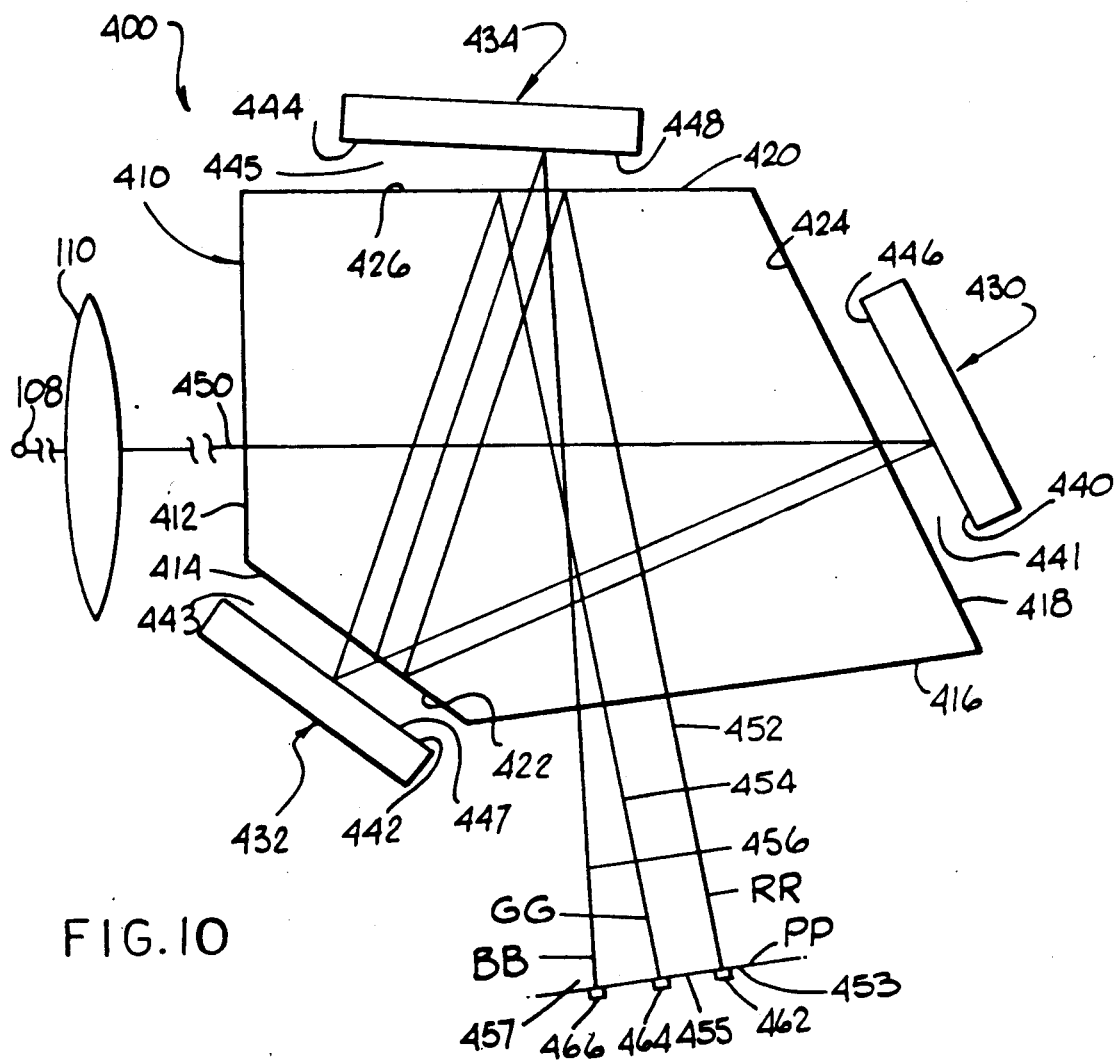
FIG. 10 is a side elevation view of another embodiment of an optical imaging apparatus.

FIG. 10 shows a optical imaging apparatus 400 which separates an incident beam of focused (by imaging lens 110) polychromatic light 450 from a line object 108 into red, green and blue component beams 452, 454 and 456 having central optical path axes RR, GG, BB. Each component beam is adapted to be placed in registration with an associated linear photosensor array 462, 464, 466 positioned in equally spaced relationship on an image plane PP and is adapted to provide a focused component image 453, 455, 457 thereon. Beam splitter assembly 400 comprises a prism 410 having first, second, third, fourth, and fifth planar faces 412, 414, 416, 418 and 420. A red and blue light reflective coating 422 which transmits green light is applied to face 414. A green and blue light reflective coating 424 which transmits red light is applied to face 418. A red and green light reflective coating 426 which transmits blue light is applied to face 420.

First, second and third plates 430, 432 and 434 having planar surfaces 440, 442 and 444 are positioned opposite prism faces 414, 418 and 420, respectively. Surfaces 440, 442 are separated from associated prism faces 414, 418 and 420 by air gaps 441, 443 and 445 and are oriented in generally parallel relationship with associated faces.

Surfaces 440, 442 and 444 are adapted to reflect red, green and blue light, respectively, from imaging light beam 450. However, color components other than the one which is adapted to be reflected by each surface 440, 442, 444 are removed from the incident beam which actually reaches it by the coating on the associated prism face. Thus each of the surfaces 440, 442, and 444 may be provided with a mirror coating 446, 447, 448.

The focus of the component image provided by each component beam 452, 454, 456 on an associated photosensor array may be adjusted by varying the distance between the plate surface, e.g. 440, which reflects a particular component beam, e.g.452, and the associated face, e.g. 418, of prism 410. The registration of each component beam with an associated photosensor array may be controlled by varying the angular relationship between the plate surface, e.g. 440, which reflects a particular component beam, e.g. 452, and the associated face, e.g. 418, of prism 410. Thus this beam splitter configuration may be used to accommodate many different photosensor array spacings, and may also be used to correct for chromatic aberration in the associated lens assembly. By providing necessary curvature in each of the plate surfaces 440, 442, 444 any astigmatism in the component images may also be corrected.

Several other beam splitter assembly embodiments are illustrated in FIGS. 11, 12, 13, and 14.

Figure 11:
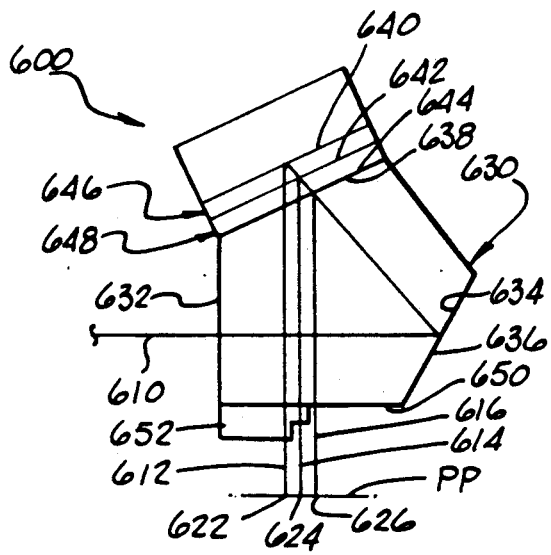
FIGS. 11-14 are side elevation views of other embodiments of an optical imaging apparatus in which each of the layers of an associated beam splitter device are nominally parallel layers.

In the beam splitter assembly 600 of FIG. 11 a polychromatic imaging light beam 610 is separated into parallel, equally spaced, red, green, and blue component beams 612, 614, 616 which provide color component images of a line object on corresponding, equally spaced, linear photosensor arrays 622, 624, 626 located on a unitary image plane PP. The imaging light beam 610 is initially transmitted through a normal face 632 of pentaprism 630. Beam 610 next impinges upon a mirror coating 634 of prism face 636 from which it is reflected toward prism face 638. Red, green, and blue component beams 612, 614, and 616 are thereafter reflected from red, green, and blue reflective coatings 640, 642, and 644 which are applied to spaced, planar surfaces of first and second thin, transparent plates 646, 648, and prism face 638. (Plates 646, 648 may be sandwiched between prism 630 and a flat support plate 649 or may be entirely supported by prism 630.) The reflected component beams pass perpendicularly through prism face 650 and thereafter through step compensator 652 before finally impinging upon the corresponding photosensors 622, 624, 626 at image plane PP.

Figure 12:
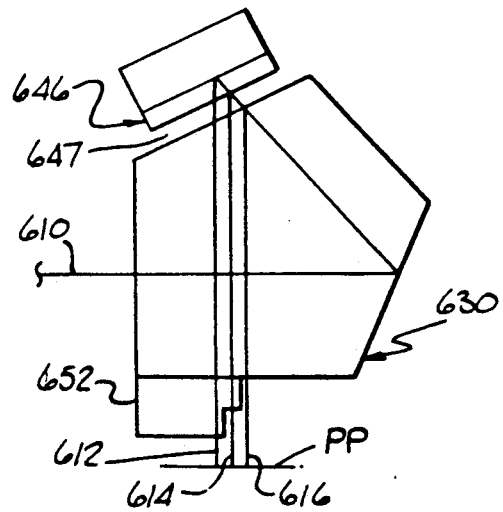

FIG. 12 illustrates a beam splitter assembly embodiment identical to FIG. 11, except that glass plate 648 has been replaced by an air gap 647. Alternatively, plate 646, rather than plate 648 could be replaced by an air gap.

Figure 13:
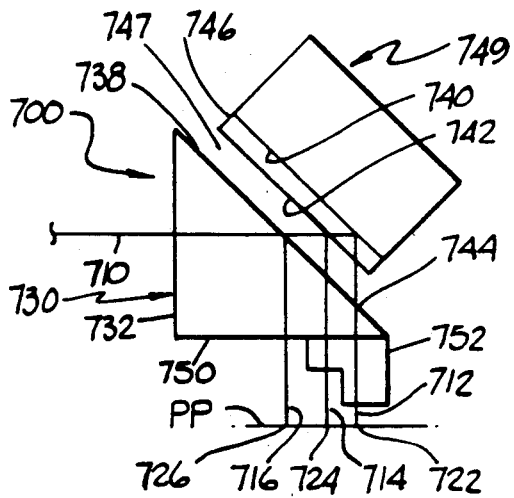

In the beam splitter assembly 700 of FIG. 13, a polychromatic imaging light beam 710 is separated into parallel, equally spaced, red, green, and blue component beams 712, 714, 716 which provide color components images of a line object on corresponding, equally spaced, linear photosensor arrays 722, 724, 726 located on a unitary image plane PP. The imaging light beam 710 is initially transmitted through a normal face 732 of 45-degree prism 730. Red, green, and blue component beams 712, 714, and 716 are thereafter reflected from red, green, and blue reflective coatings 740, 742, and 744 which are applied to spaced, planar surfaces of thin, transparent plate 746 and prism face 738. Plate 746 may be mounted on a support plate 749 and may be separated from prism face 738 by an air gap 747. The reflected component beams pass perpendicularly through prism face 750 and thereafter through step compensator 752 before finally impinging upon the corresponding photosensors 722, 724, 726 at image plane PP.

Figure 14:
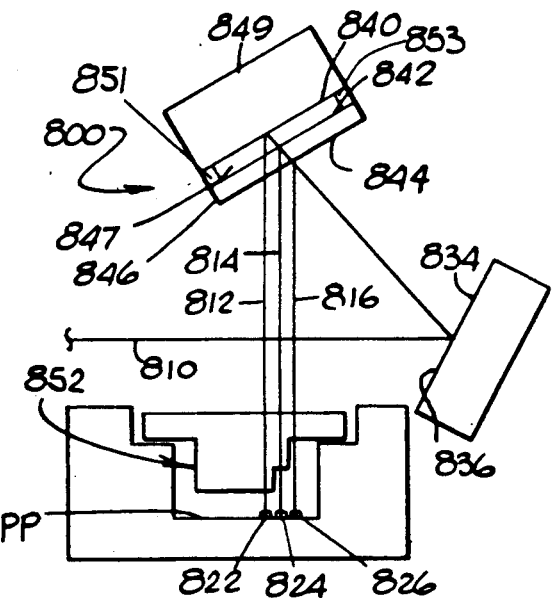

In the beam splitter assembly 800 of FIG. 14, polychromatic imaging light beam 810 is separated into parallel, equally spaced, red, green, and blue component beams 812, 814, 816 which provide color components images of a line object on corresponding, equally spaced, linear photosensor arrays 822, 824, 826 located on a unitary image plane PP. The imaging light beam 810 initially impinges upon a mirror coating 834 of planar plate surface 836 from which it is reflected toward plates 846 and 849. Red, green, and blue component beams 812, 814, and 816 are thereafter reflected from red, green, and blue reflective coatings 840, 842, and 844 which are applied to spaced, planar surfaces of thin, transparent plate 846 and thick plate 849. (Plate 846 may be mounted on plate 849 by means of spacers 851, 853 which provide an air gap 847 between the plates.) The reflected component beams pass perpendicularly through step compensator 852 before finally impinging upon the corresponding photosensors 822, 824, 826 at image plane PP.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. An optical imaging apparatus comprising:
    an imaging lens means for imaging a line object;
    a beam splitter means for splitting a polychromatic imaging light beam emanating from said line object and focused by said imaging lens means into first, second and third, spacially and spectrally separated, component beams of first, second and third spectral ranges;
    first, second and third linear photosensor arrays positioned in parallel, spaced apart relationship at a unitary image plane and adapted to be impinged by said first, second and third component beams, respectively, for generating data signals representative of color component images focused thereon;
    said beam splitter means comprising:
        first planar surface means for transmitting light in said first spectral range and for reflecting light in said second and third spectral ranges;
        second planar surface means positioned adjacent to said first planar surface means in generally parallel relationship therewith for reflecting light in said first spectral range;
        third planar surface means oriented obliquely of said first and second surface means for transmitting light in said second spectral range and for reflecting light in said first and third spectral ranges;
        fourth planar surface means positioned adjacent to said third planar surface means in generally parallel relationship thereto for reflecting light in said second spectral range;
        said second and fourth planar surface means being spaced from said first and third surface means at distances adapted to provide a focused component image on each of said first and second linear photosensor arrays.

2. The invention of claim 1, wherein said imaging lens means comprises different focal lengths for at least two of said first, second and third spectral ranges of light.

3. The invention of claim 2, wherein each of said second and fourth planar surface means are inclined at a selected angle with respect to said first and third surface means, respectively, such that each of said first and second component images is placed in registration with a corresponding linear photosensor means.

4. The invention of claim 3 wherein at least one of said angles of inclination is other than zero degrees.

5. The invention of claim 4 wherein said linear photosensor arrays are equally spaced apart on said image plane.

6. The invention of claim 1 further comprising fifth planar surface means oriented obliquely of said third surface means for transmitting light in said third spectral range and for reflecting light in said first and second spectral ranges;
    sixth planar surface means positioned adjacent to said fifth planar surface means in generally parallel relationship therewith.

7. An optical device for splitting an imaging light beam into at least three spacially and spectrally separated component beams comprising:
    a plurality of surface pairs; each of said surface pairs comprising a first surface and a second surface; said first surface of each of said surface pairs being adapted to reflect a different one of said component beams; said second surface of each of said surface pairs being adapted to reflect all of said component beams except for the component beam reflected by said associated first surface; said surface pairs comprising:
    first surface pair means for initially reflectively separating said imaging light beam into only two beams comprising a first component beam and a first remainder beam; and
    second surface pair means for reflecting said first component beam and for reflectively separating said first remainder beam into only two beams comprising a second component beam and a second remainder beam.

8. The invention of claim 7, further comprising a photosensor array associated with each of said component beams; each first surface of each surface pair being spaced at a distance from each associated second surface such that the component beam reflected from each first surface provides a focused component image on the associated photosensor array.

9. The invention of claim 8 wherein each first surface of each surface pair is angularly positioned with respect to each second surface such that the component beam reflected from each first surface is positioned in registration with the associated photosensor array.

10. The invention of claim 9 wherein said photosensor arrays are coplanar.

11. The invention of claim 10 wherein said photosensor arrays ar evenly spaced apart.

12. The invention of claim 9 wherein said first and second surfaces of each surface pair are separated by an air gap.

13. The invention of claim 12 wherein one of said first and second surfaces of each of said surface pairs is provided on a different face of a prism.

14. The invention of claim 13 wherein one of said first and second surfaces of each-of said surface pairs is provided on a rigid member positioned opposite a face of said prism.

15. The invention of claim 13 wherein said second surface of each of said surface pairs is provided on a different face of said prism.

16. The invention of claim 15 wherein said first surface of each of said surface pairs is provided on a rigid member positioned opposite a face of said prism.

17. The invention of claim 7 wherein the number of said surface pairs is equal to the number of said component beams.

18. The invention of claim 7 wherein the number of said surface pairs is equal to one less than the number of said component beams.

19. The invention of claim 18 wherein there are two of said surface pairs and three of said component beams.

* * * * *